(12) United States Patent
Heyring et al.

(10) Patent No.: US 6,270,098 B1
(45) Date of Patent: Aug. 7, 2001

(54) LOAD DISTRIBUTION UNIT FOR VEHICLE SUSPENSION SYSTEM

(75) Inventors: Christopher Brian Heyring, Eagle Bay; Richard Monk, Dunsborough, both of (AU)

(73) Assignee: Kinetic Limited, Dunsborough (AT)

( * ) Notice: Subject to any disclaimer, the term of this patent is extended or adjusted under 35 U.S.C. 154(b) by 0 days.

(21) Appl. No.: 09/269,476

(22) PCT Filed: Oct. 28, 1997

(86) PCT No.: PCT/AU97/00719

§ 371 Date: Mar. 29, 1999

§ 102(e) Date: Mar. 29, 1999

(87) PCT Pub. No.: WO98/18641

PCT Pub. Date: May 7, 1998

(30) Foreign Application Priority Data

Oct. 31, 1996 (AU) .................................................. PP 3362
Nov. 7, 1996 (AU) .................................................. PP 3505

(51) Int. Cl.$^7$ .................................................. B60G 21/06
(52) U.S. Cl. ........................... 280/124.161; 280/124.104; 280/124.106; 280/6.155; 280/5.505; 280/5.507
(58) Field of Search ...................... 280/124.104, 124.106, 280/124.161, 124.157, 124.16, 124.107, 124.1, DIG. 1, 6.155, 6.154, 5.506, 5.505, 5.507; 180/41

(56) References Cited

U.S. PATENT DOCUMENTS

| | | | |
|---|---|---|---|
| 3,477,733 | * 11/1969 | Gottschalk | 280/124.104 |
| 3,752,497 | * 8/1973 | Enke et al. | 280/124.106 |
| 4,504,079 | * 3/1985 | Strong | 280/DIG. 1 |
| 5,040,823 | * 8/1991 | Lund | 280/124.104 |
| 5,447,332 | 9/1995 | Heyring . | |
| 5,601,307 | * 2/1997 | Heyring et al. | 280/124.161 |
| 5,794,966 | * 8/1998 | MacLeod | 280/124.106 |

FOREIGN PATENT DOCUMENTS

| | | | |
|---|---|---|---|
| 820194 | * 9/1959 | (GB) | 280/124.106 |
| 2071587 | 9/1981 | (GB) . | |
| 9523076 | 8/1995 | (WO) . | |
| 9701453 | 1/1997 | (WO) . | |

* cited by examiner

Primary Examiner—Daniel G. DePumpo
Assistant Examiner—F. Zeender
(74) Attorney, Agent, or Firm—Birch, Stewart, Kolasch & Birch, LLP

(57) ABSTRACT

A load distribution unit is utilized in a vehicle suspension system having at least one pair of laterally adjacent forward wheel assemblies, and at least one pair of laterally adjacent rear wheel assemblies. A wheel ram is associated with each of the wheel assemblies, each wheel ram including a major chamber therein. The load distribution unit includes a plurality of fluid chambers, each fluid chamber being divided into at least two control chambers by at least one piston supported therein. Two pairs of the control chambers which vary in volume proportionally and in opposite senses therein with piston motion are system chambers, and at least two of the remaining control chambers are bump chambers. The pistons are interconnected by at least one connection device. The major chamber of each wheel ram is in fluid communication with a respective system chamber. The vehicle suspension system provides a roll stiffness and a pitch stiffness while providing minimum cross-axial articulation stiffness.

10 Claims, 6 Drawing Sheets

LOAD DISTRIBUTION UNIT FOR VEHICLE SUSPENSION SYSTEM

This application is the national phase under 35 U.S.C. §371 of prior PCT International Application No. PCT/AU97/00719 which has an International filing date of Oct. 28, 1997 which designated the United States of America.

BACKGROUND OF THE INVENTION

1. Field of the Invention

The present invention is generally directed to vehicle suspension systems. and in particular to a load distribution unit for a vehicle suspension system.

2. Description of the Background Art

The applicant has previously developed a vehicle fluid suspension system including a load distribution unit which performs the function of redistributing fluid between two pairs of diagonally interconnected double-acting or four single-acting rams respectively provided at each wheel assembly of the vehicle during cross-axle articulation motions, whilst opposing roll motions and introducing a controlled magnitude of pitch resilience. Such a suspension system is described in the applicant's International Application No. PCT/AU95/00096, details of which are incorporated herein by reference.

SUMMARY OF THE INVENTION

The present invention relates to an improved construction of said load distribution unit which can potentially reduce the packaging volume and weight of the original arrangement of the unit by more than 30% thereby increasing the mass production viability of the suspension system as a whole.

With this in mind, according to one aspect of the present invention, there is provided a load distribution unit for a vehicle suspension system having at least one pair of laterally adjacent forward wheel assemblies, and at least one pair of laterally adjacent rear wheel assemblies, a wheel ram associated with each said wheel assembly, each wheel ram including a major chamber therein, wherein the load distribution unit includes two pairs of axially aligned fluid chambers, each fluid chamber being divided into two control chambers by a piston supported therein, in each pair of axially aligned fluid chambers two of the control chambers which vary in volume proportionally and in opposite senses therein with piston motion are system chambers, the remaining two chambers in each pair of axially aligned fluid chambers being bump chambers, the piston of each said axially aligned pair of fluid chambers being interconnected by a connection means, the major chamber of each said wheel ram being in fluid communication with a respective said system chamber, such that as the vehicle suspension system provides a roll stiffness and a pitch stiffness while providing minimal cross-axle articulation stiffness, and wherein a fluid communication is provided between pairs of the bump chambers such that the fluid pressure within the communicating bump chambers is transferable therebetween to thereby enable a pressure balance to be achieved between the system chambers.

The connection means interconnecting the pistons may be a rod member extending through the two control chambers in the middle of each pair of axially aligned fluid chambers.

A respective pair of the fluid chambers may be connected to the major chambers of the wheel rams on each side of the vehicle and the pistons located within each said respective pair of fluid chambers may be urged for movement in opposing axial directions to thereby enable the suspension system to resist roll motion by providing a roll stiffness while also providing a minimal cross-axle articulation stiffness.

Furthermore, the piston located within the pair of fluid chambers connected to the major chambers of the wheel rams at the front or rear of the vehicle may be urged for movement in opposing axial directions when the wheel assemblies are undergoing cross-axle articulation motion and may be urged for movement in the same axial direction when the vehicle is undergoing pitch motion to thereby confer minimal articulation stiffness and provide a pitch stiffness which is independent of the roll, four wheel bounce or articulation stiffnesses.

The bump chambers may be in fluid communication with accumulator means to thereby allow for a greater degree of resilience for the vehicle suspension system such that transient vertical motions of the wheel assemblies which can arise when the vehicle is travelling over a speed bump can be accommodated by the load distribution unit.

The fluid chambers may be of differing sizes to enable the pressures in the load distribution unit to be set as required during the design process. Each pair of fluid chambers may be located in parallel adjacent relation. Alternatively, each pair of chambers may be positioned in different positions in the vehicle or aligned along a common axis.

According to a second aspect of the invention there is provided a load distribution unit for a vehicle suspension system having at least one pair of laterally adjacent forward wheel assemblies, and at least one pair of laterally adjacent rear wheel assemblies, a wheel ram associated with each said wheel assembly, each wheel ram including a major chamber therein, wherein the load distribution unit includes three fluid chambers aligned along a common axis to thereby provide opposing end chambers and a central chamber therebetween, the end chambers being respectively divided by a piston supported therein into two control chambers, the central chamber being divided by two pistons into two control chambers and a central bump chamber, two of the control chambers which vary in volume proportionally and in opposite senses with piston motion being separate bump chambers, the remaining four control chambers being system chambers, respective connection means interconnecting each of the pistons in the central chamber to the piston in an adjacent said end chamber, the major chamber of each said wheel ram being in fluid communication with a respective one of the system chambers, such that the vehicle suspension system provides a roll stiffness and a pitch stiffness while providing minimal cross-axle articulation stiffness, the two separate bump chambers of each end chamber being in fluid communication such that the fluid pressure within the communicating bump chambers is transferable therebetween to thereby enable a pressure balance to be achieved between the system chambers.

The connection means interconnecting the pistons may be a rod member extending through a said control chamber of the central chamber and a said control chamber of the end chamber adjacent thereto.

The two separate bump chambers may be in fluid communication with an accumulator means, and the central bump chamber may be in fluid communication with an accumulator means.

In devices such as rams and load distribution units described above, the problem of stationary friction or "stiction" where there is an initial resistance to movement of a stationary piston in a chamber can arise. This undesirable effect is especially prevalent in seals where there exists a large pressure difference across the seals which energises the seal firmly into the sealing surface giving high levels of friction. It is commonly found that there is only a certain reduction of the energising force possible (giving a set reduction in friction levels) whilst still maintaining a low fluid loss seal. This friction level can significantly retard the response time of the suspension system which can be detrimental to the ride comfort of the vehicle. The application seeks to overcome this problem by utilising fluid containers having at least a portion which is flexible to function as the chambers of the fluid ram. A similar problem can also arise in a load distribution unit with stiction between the piston seals and the bores, and the rod seals and the rods.

Hence, according to a further aspect of the present invention, there is provided a load distribution unit for a vehicle suspension system having at least one pair of laterally adjacent forward wheel assemblies, and at least one pair of laterally adjacent rear wheel assemblies, a wheel ram associated with each said wheel assembly, each wheel ram including a major chamber therein, wherein the load distribution unit includes a housing divided into a pair of chamber sets, each chamber set including two axially aligned end chambers and a central chamber located and axially aligned therebetween, pistons respectively located within the central chamber and within each said end chamber, the pistons being interconnected to thereby provide for common movement of the interconnected pistons therein, the piston: within the central chamber dividing said chamber into two system chambers, the piston within each said end chamber dividing said end chamber to provide a bump chamber on one side thereof, a flexible fluid container being located within each said system chamber and being respectively in fluid communication with the major chamber of a said wheel ram such that the vehicle suspension system provides a roll stiffness and a pitch stiffness while providing minimal cross-axle articulation stiffness, flexible fluid container being located within each bump chamber, with fluid communication being provided between the fluid containers in each pair of bump chambers such that the fluid pressure within the communicating bump chambers is transferable therebetween to thereby enable a pressure balance to be achieved between the system chambers.

Alternatively the load distribution unit may be arranged as described hereinafter, this alternate form being preferable from the manufacturing and packaging standpoints.

According to yet another aspect of the present invention there is provided a load distribution unit for a vehicle suspension system having at least one pair of laterally adjacent forward wheel assemblies, and at least one pair of laterally adjacent rear wheel assemblies, a wheel ram associated with each said wheel assembly, each wheel ram including a major chamber therein, wherein the load distribution unit includes a housing divided into a pair of chamber sets, each chamber set including two axially aligned chambers, pistons respectively located within each said chamber, the pistons being interconnected by a connection means to thereby provide for common movement of the interconnected pistons therein, each piston dividing its respective chamber into two control chambers, in each pair of axially aligned chambers, two of the control chambers which in volume are inversely proportional therein with piston motion are system chambers, the remaining two control chambers in each pair of axially aligned chambers being bump chambers, a flexible fluid container being located within each said system chamber and being respectively in fluid communication with the major chamber of a said wheel ram such that the vehicle suspension system provides a roll stiffness and a pitch stiffness while providing minimal cross-axle articulation stiffness, a flexible fluid container being located within each bump chamber, with fluid communication being provided between the fluid containers of each pair of bump chambers such that such that the fluid pressure within the communicating bump chambers is transferable therebetween to thereby enable a pressure balance to be achieved between the system chambers.

In the load distribution units as described above, the fluid containers located in the bump chambers and in fluid communication may also be in fluid communication with an accumulation means such as a hydropneumatic accumulator.

It is therefore generally possible to use the fluid containers in any of the load distribution units described above to replace the conventional hydropneumatic piston/chambers arrangement.

The load distribution unit may be used in a vehicle suspension system wherein the wheel ram is double acting having said major chamber and a minor chamber in which a piston rod of the wheel ram is located, the major chamber of each wheel ram being in direct fluid communication with the minor chamber of a diagonally opposite said wheel ram by a fluid communicating conduit, with each said system chamber of the load distribution unit being a fluid communication with a respective said fluid communicating conduit. Alternatively, the load distribution unit may be used in a vehicle suspension system wherein the wheel rams are single acting.

According to a further aspect of the present invention, there is provided a vehicle suspension system including a load distribution unit as described above.

The vehicle suspension system may be controlled by the control method described in the Applicant's International Application No: PCT/AU96/00397, details of which are incorporated herein by reference.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

It will be convenient to further describe the invention with reference to the accompanying drawings which illustrate possible embodiments of a load distribution unit according to the present invention, although other arrangements are also envisaged. Consequently the particularity of the accompanying drawings is not to be understood as superseding the generality of the preceding description of the invention.

In the drawings.

DETAILED DESCRIPTION OF THE PREFERRED EMBODIMENTS

Figure 1:
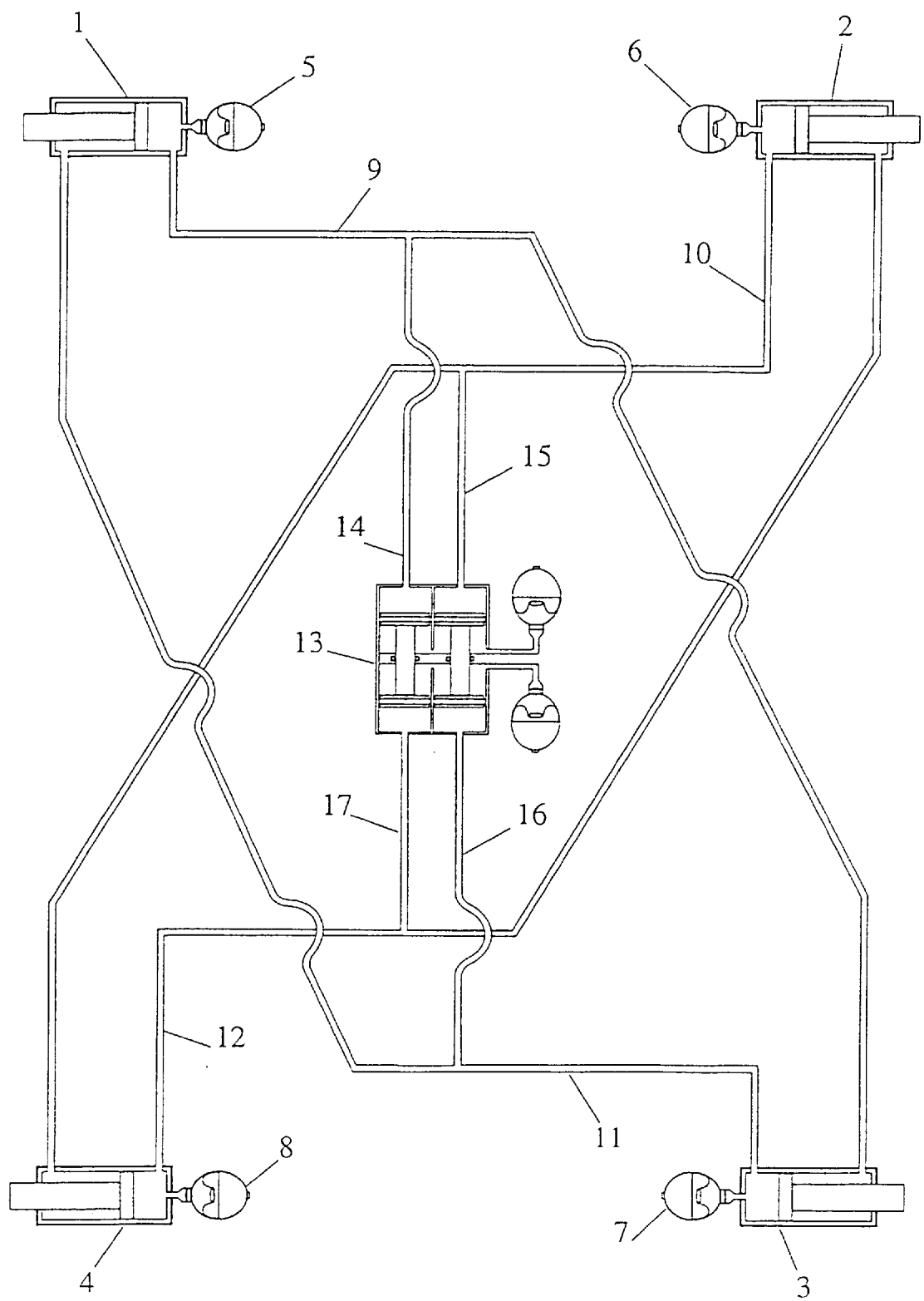
FIG. 1 is a schematic view of a vehicle suspension system incorporating a preferred embodiment of a load distribution unit according to the present invention.

Referring now to FIG. 1 there are four double acting hydraulic rams (1, 2, 3, 4) shown interconnected between the vehicle body and the support means of the vehicle (for example, wheels, floats, skis). The layout corresponds to a plan view of the vehicle with the front being towards the top of the page, so the hydraulic ram 1 is associated with the front left support means of the vehicle and the hydraulic ram 4 is associated with the back left support means of the vehicle. Each ram has a hydropneumatic accumulator (5, 6, 7, 8) in fluid communication with the major chamber of the ram via a damper valve. The major chamber of each ram is in direct fluid communication with the minor chamber of the diagonally disposed ram by fluid communicating conduits (9, 10, 11, 12). The four fluid communicating conduits are connected to a load distribution unit 13 by respective branch lines (14, 15, 16, 17).

Figure 2:
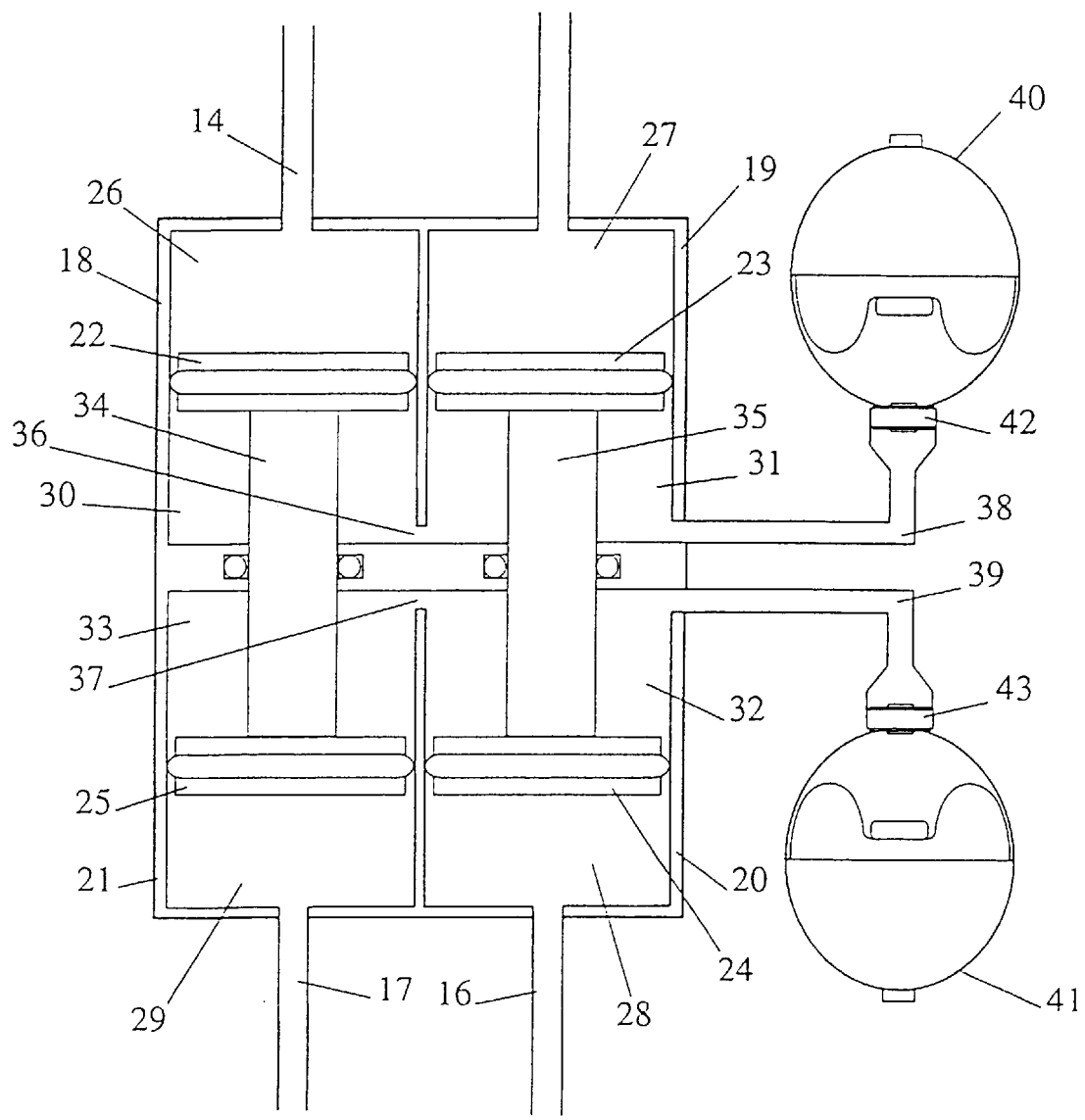
FIG. 2 is an enlarged schematic view of the load distribution unit of FIG. 1.

The same first embodiment of the load distribution unit 13 is shown in FIG. 2, enlarged for clarity, with the same reference numerals being used for common components.

The load distribution unit 13 comprises two pairs of fluid chambers 18, 21 and 19, 20, each fluid chamber in a pair being aligned along a common axis, the axis of the two pairs being parallel. Each fluid chamber is divided into two chambers by pistons 22, 23, 24, 25 forming a system chamber 26, 27, 28, 29 and a bump chamber 30, 31, 32, 33 in each fluid chamber, the pistons of each adjacent aligned fluid chamber are connected by rods 34, 35. The major chamber of the front left ram 1 is in fluid communication with the front left system chamber 26 of the load distribution unit via conduit 9 and branch line 14. Similarly the system chambers 27, 28, 29 respectively are associated with the major chambers of the front right, back right and back left hydraulic rams 2, 3, 4 respectively.

The bump chambers 30, 31 in the front rams 18, 19 of the load distribution unit are interconnected by a passage 36 and are generally described as front bump chambers since as the front wheels of the vehicle ride over a bump, fluid is displaced from the major chambers of the front rams into the front system chambers of the load distribution unit. This pushes the pistons 22 and 23 rearwards expelling fluid from the front bump chambers along the conduit 38 into the front bump accumulator 40. Since the rods 34, 35 join the rearward pistons 24, 25 to the forward pistons 22, 23, as the front wheels are riding over a bump and the forward pistons 22, 23 are pushed rearwards, fluid is expelled from the back system chambers 28, 29, extending the rear suspension rams. Fluid is also drawn into the back bump chambers 32, 33, which are interconnected by a passage 37, and connected to a back bump accumulator 41 via conduit 39. To damp this motion, damper valves 42, 43 may be provided in the mouths of the bump accumulators.

It is important to note that the locations of the chambers described above is only one of a number of connection arrangements possible with the above style of load distribution unit. For example the system chambers could all be located in the forward fluid chambers 18 and 19 giving a mechanical advantage between the front and rear systems which can be used to control roll split. The bump chambers are then accommodated within the remaining fluid chambers 20 and 21. Furthermore the fluid chambers which comprise the load distribution unit may be of differing diameters to increase the range of design options, along with the alternative chamber positions.

Figure 3:
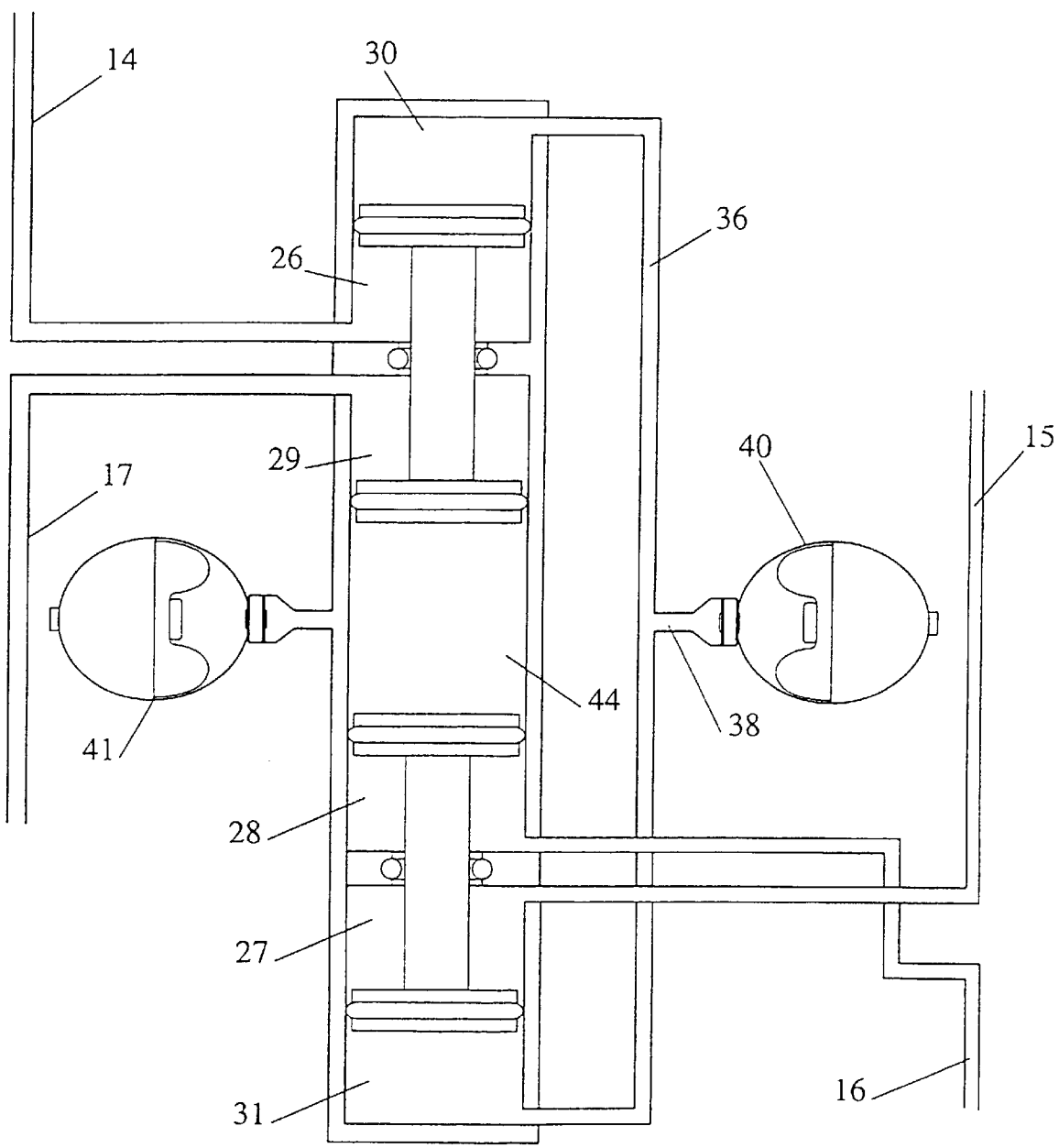
FIGS. 3 to 6 are schematic views of other alternative preferred embodiments of a load distribution unit according to the present invention.

A second preferred embodiment of a load distribution unit according to the present invention is illustrated in FIG. 3. The branch lines (14, 15, 16, 17) to the system fluid conduits are shown in the same layout as in FIG. 1. For example the branch line 14 connects the front left system chamber 26 of the load distribution unit to the major chamber of the front left hydraulic suspension ram. The system chambers and bump chambers are swapped over compared to the earlier embodiments so that the system chambers are now the smaller volume chambers through which the rod passes, and the bump chambers are the larger chambers. One half of the load distribution unit has been rotated through one-hundred and eighty degrees and placed on one end of the other half, along a common axis. This places the back bump chambers together and they can be joined by removing the wall to make one common back bump chamber 44 and connected through conduit 39 to a back bump accumulator 41.

The two front bump chambers 30, 31 are located at the ends of the unit and interconnected by a passage 36, communicated with the front bump accumulator 40 via conduit 38. The function of the unit is similar to the first embodiment, the main difference being that the ratio of system to bump chamber areas can be reversed to give a wider range of sizing options to the designer.

The load distribution unit may also be used in a suspension system having single acting rams. In this arrangement, the major chamber of each ram can be in direct fluid communication with a system chamber of the load distribution unit.

Figure 4:
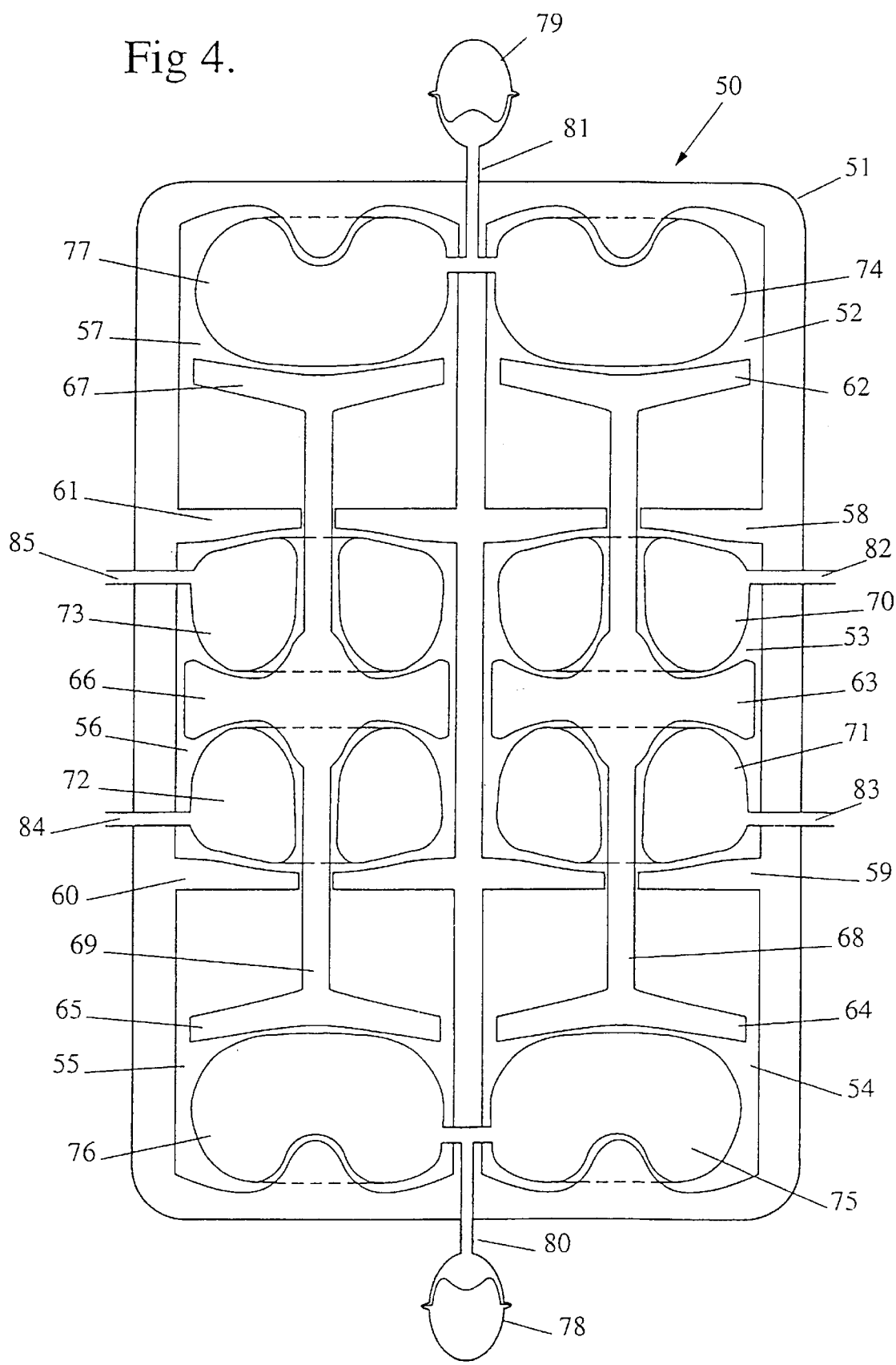

FIG. 4 shows a straightforward application of fluid containers in the form of flexible bags to a third embodiment of a load distribution unit according to the present invention. The load distribution unit 50 comprises a housing 51 which is divided by dividing walls 58, 59, 60, 61 into six major chambers 52, 53, 54, 55, 56, 57 aligned along two parallel axes, three major chambers on each axis.

The major chamber in the centre on the left hand side of the figure is divided into two minor chambers by the central dividing piston 66, these minor chambers house individual system fluid bags 72 and 73 respectively. Similarly the major chamber in the centre on the right hand side of the figure is divided into two minor chambers by the central dividing piston 63, these minor chambers house individual system fluid bags 70 and 71 respectively. The system fluid bags are connected to the chambers of the actuators at each wheel by conduits 82, 83, 84, 85 in a connection sequence as described in the applicant's earlier noted patents and patent application so will not be further detailed herein. For the purposes of describing the operation of the present invention it will be assumed that the four system fluid bags communicate with the major chambers of the rams in corresponding positions, for example the left hand side forward system fluid bag 73 communicates with the major chamber of the ram associated with the front left wheel of the vehicle.

The left hand side forward major chamber 57 is divided by piston 67 forming two minor chambers, the most forward one of which accommodates a back bump fluid bag 77.

Similarly the right hand side forward major chamber 52 is divided by piston 62 forming two minor chambers, the most forward one of which accommodates the other back bump fluid bag 74. The conduit 81 joining the two back bump fluid bags and the back bump accumulator 79 permits fluid flow between the bags and from the bags into the back bump accumulator.

Similarly the rearward major chambers 54, 55 contain dividing pistons 64, 65 respectively and the front bump bags 75, 76 respectively. The front bump bags are joined to each other and to the front bump accumulator 78 by the conduit 80.

All three pistons 65, 66, 67 in the major chambers 55, 56, 57 on the left hand side of the unit 50 are joined together by the piston rod 69. Likewise the pistons 62, 63, 64 in the major chambers on the right hand side are joined together by piston rod 68.

When the front wheels of the vehicle ride over a bump and the corresponding actuators become compressed, fluid is expelled from the wheel rams into the associated system fluid bags 70, 73 in the load distribution unit. This causes the piston rods 68, 69 to be thrust rearwards, compressing the front bump fluid bags 75, 76 and forcing fluid into the associated front bump accumulator 78.

A toroidal fluid bag may alternatively be placed in each free minor chamber, replacing the larger bump bags 74, 75, 76, 77 illustrated. It should be understood that if this is done, all bump bags must be replaced in a similar manner to retain the functionality of the load distribution unit. Also the new toroidal fluid bags next to the dividing walls 58 and 61 are now front bump bags replacing the illustrated front bump bags 75, 76 at the other end of the unit.

Similarly, the new toroidal fluid bags next to the dividing walls 59 and 60 are now back bump bags replacing the illustrated back bump bags 74, 77 at the opposite end of the unit.

Figure 5:
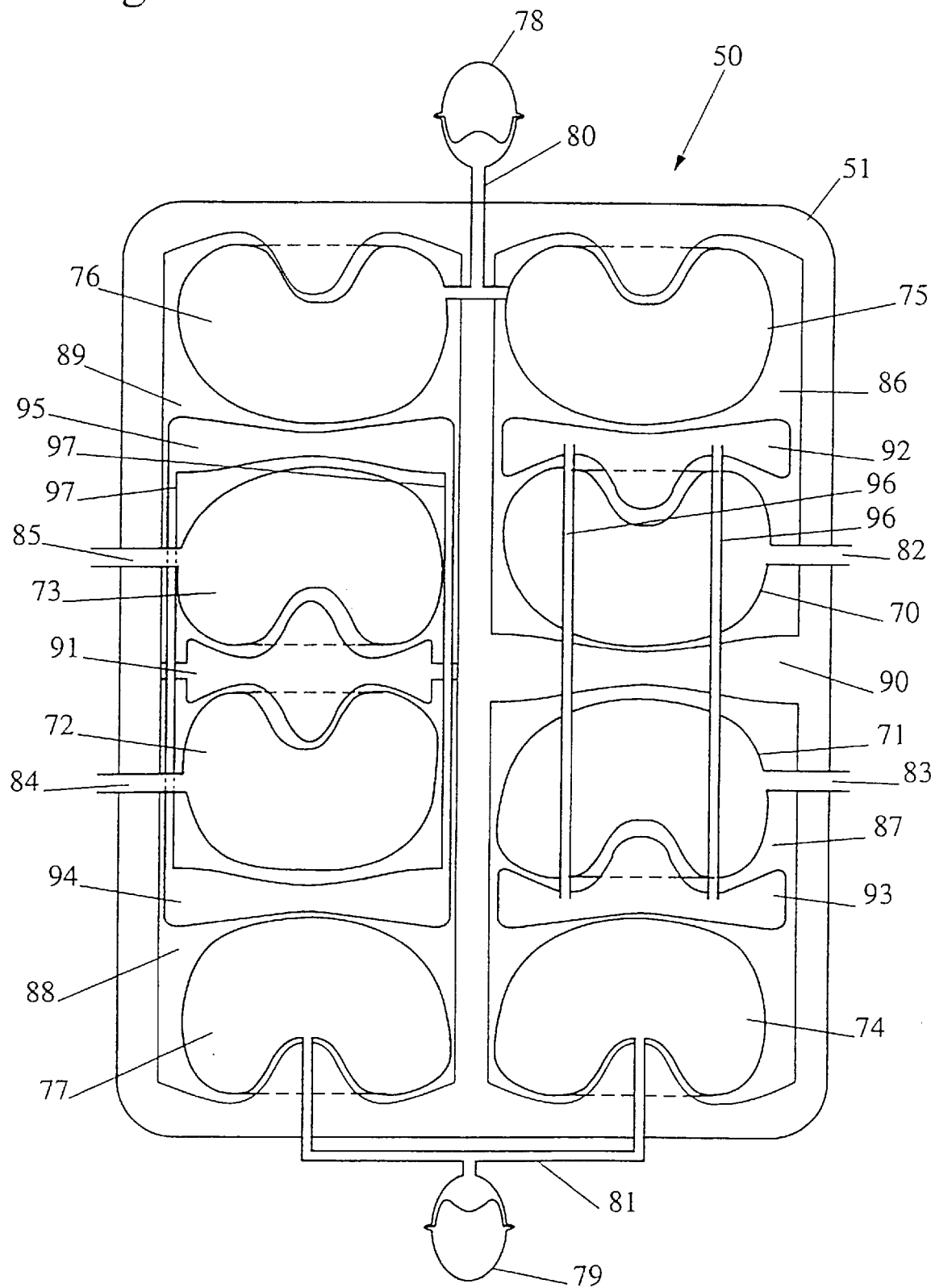

FIG. 5 illustrates a fourth preferred embodiment of the load distribution unit 50 according to another aspect of the present invention. The essential functionality of the load distribution unit is not altered, yet the packaging length required is much reduced as only two aligned major chambers 86, 87 and 88, 89 are necessary on each side. The major chambers on the left hand side of the housing 51 are formed by the fixed dividing wall 91 which is shaped very like the central piston 66 in FIG. 4. The forward major chamber 89 is divided into two minor chambers by the piston 95. Each of these minor chambers houses a fluid bag 73, 76. The front left system fluid bag 73 is connected to the front left wheel actuator as previously described for FIG. 4, and is now positioned between the dividing wall 91 and the front left load distribution unit piston 95. The minor chamber on the other side of the piston 95 contains a front bump fluid bag 76. The rearward left hand side major chamber 88 is divided by a back left load distribution unit piston 94 into two minor chambers housing the back left system fluid bag 72 and a back bump fluid bag 77. The two left hand load distribution unit pistons 94, 95 are fixed together by bars 97 arranged around the periphery of the pistons. The back left system fluid bag 72 is housed in the minor chamber between the dividing wall 91 and the back left load distribution unit piston 94 such that as the pistons move in unison, the volume of fluid in the back left system fluid bag 72 varies substantially reciprocally with the volume of fluid in the front left system fluid bag 73.

The construction illustrated in FIG. 5 for the right hand side of the load distribution unit is similar to that for the left hand side, the changes being restricted to the shaping of the dividing wall 90 forming major chambers 86, 87, and the shaping of the pistons 92, 93 in said chambers. The positioning of the fluid bags corresponds to the left hand side, so for example the front right system fluid bag 70 is housed in the minor chambers formed between the front right load distribution unit piston 92 and the dividing wall 90. On the other side of the piston 92 is a front bump fluid bag 75, which is connected to the front bump fluid bag 76 on the left hand side and the front bump accumulator 78 by the conduit 80. The back right major chamber 87 is divided by the back right load distribution unit piston 93 into two minor chambers which house the back right system fluid bag 71 and a back bump fluid bag 74. The front and back right load distribution unit pistons 92, 93 are fixed together by bars 96 arranged around the periphery of the pistons. The back right system fluid bag 71 is housed in the minor chamber between the dividing wall 90 and the back right load distribution unit piston 93 such that as the pistons move in unison, the volume of fluid in the back right system fluid bag 71 varies substantially reciprocally with the volume of fluid in the front right system fluid bag 70. The back bump fluid bags 74, 77 and the back bump accumulator 79 are connected by the conduit 81.

Figure 6:
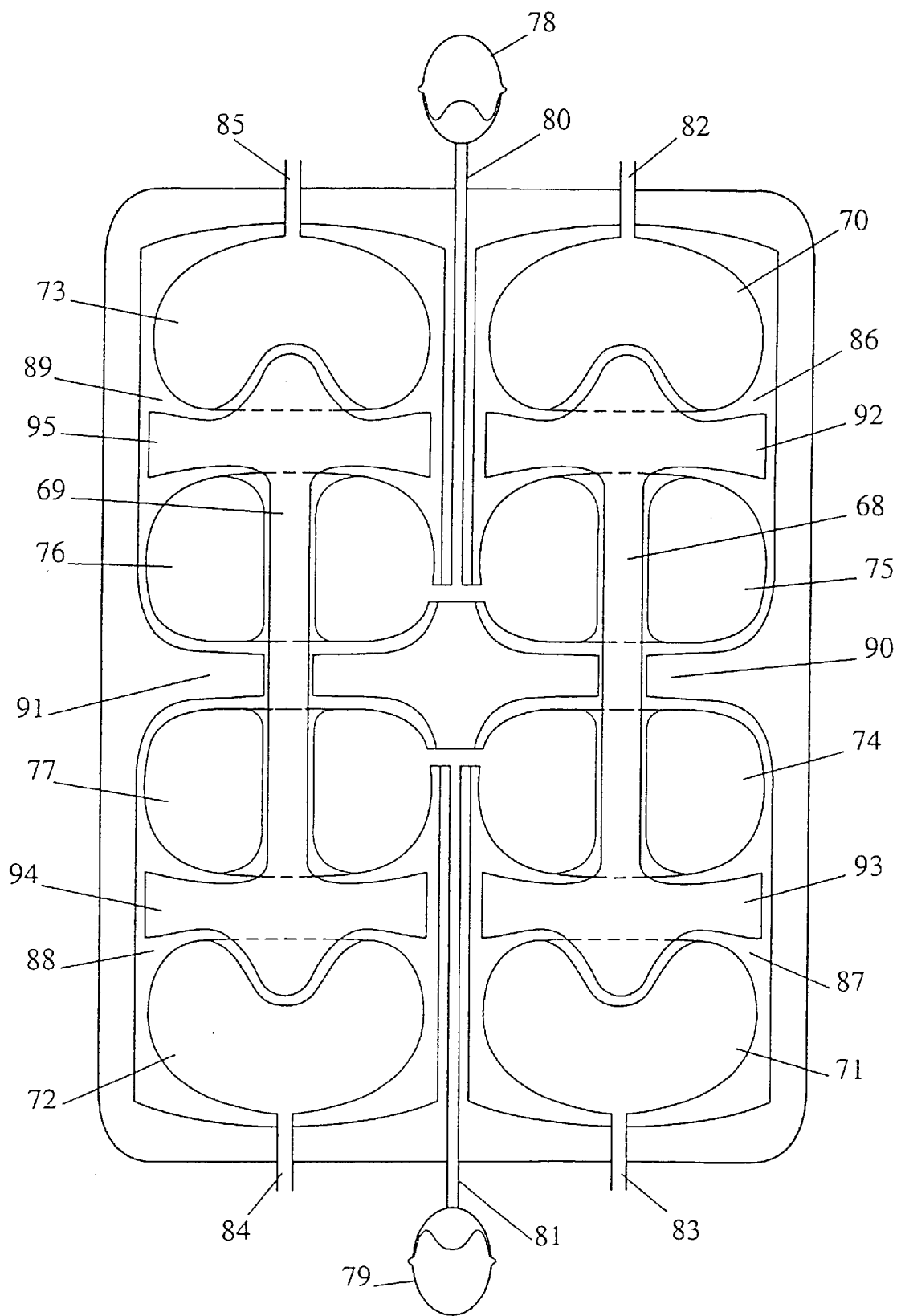

FIG. 6 shows a load distribution unit 50 of similar form to that illustrated in FIG. 5, the differences being largely restricted to the positioning of the bump and system fluid bags. The load distribution unit pistons. are also now fixed together by piston rods 68, 69 as in FIG. 4. This alternative arrangement allows the matching of pressures, areas and resultant forces to enable optimal sizing of the components during system design. The system bags 70, 71, 72, 73 now occupy the outermost minor chambers and the bump bags 74, 75, 76, 77 occupy the minor chambers on either side of the dividing walls 90, 91. For example the front left major chamber 89 is divided by the front left load distribution unit piston 95 into two minor chambers, the outermost of which contains the front left system fluid bag 73. The other minor chamber between the front left load distribution unit piston 95 and the dividing wall 91 houses a front bump fluid bag 76 which is connected to the other front bump fluid bag 75 and the front bump accumulator by the conduit 80 as described for the preceding embodiments of the load distribution unit according to the present invention.

It should be further noted that the major chambers may be of differing volumes, the piston rods 68, 69 may be extended through the ends of the casing and the end portions have two major chambers at one end of the housing 51, and the front and back bump fluid bags may be housed in the two major chambers at the other end of the housing. Any or all of the above options can be used to assist in the matching of pressures, areas and resultant forces to enable optimal sizing of the components during system design.

Furthermore, the major chambers of the load distribution unit may be aligned along a single common axis as described in the applicant's prior patents and patent applications. This can be achieved by, for example, rotating the left hand side portion of the load distribution unit through 180° in plan view, then fixing it to either end of the right hand side portion. One of the bump fluid bags can then be discarded.

It is also envisaged that the load distribution unit be provided as two separate housings respectively controlling the left and right sides of the vehicle. These housings can then be positioned in separate locations within the vehicle.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The claims defining the invention are as follows:

1. A load distribution unit for a vehicle suspension system having at least one pair of laterally adjacent forward wheel assemblies, and at least one pair of laterally adjacent rear wheel assemblies, a wheel ram associated with each said wheel assembly, each wheel ram including a major chamber therein, wherein the load distribution unit comprises a first pair of axially aligned fluid chambers, and a second pair of axially aligned fluid chambers, each fluid chamber being divided into two control chambers by a piston supported therein, the pistons in the first fluid chamber pair being interconnected by a first connection means and the pistons in the second fluid chamber pair being interconnected by a second connection means, said first and second connection means respectively comprising a rod extending through the two control chambers in the middle of each pair of axially aligned fluid chambers and contained entirely within respective said first and second pair of fluid chambers, two of the control chambers in each fluid chamber pair being system chambers which vary in volume proportionally and in opposite senses therein with piston motion, the remaining two control chambers in each fluid chamber pair being bump chambers, the system chambers of the first fluid chamber pair being in fluid communication with the major chambers of the wheel rams on one side of the vehicle, the system chambers of the second fluid chamber pair being in fluid communication with the major chambers of the wheel rams on the opposite side of the vehicle, wherein in each fluid chamber pair, one system chamber is a front system chamber connectable to at least one of the forward wheel assemblies, the other system chamber is a rear system chamber connectable to at least one of the rear wheel assemblies on the same side of the vehicle, such that a pressure increase in the major chambers of the wheel rams on one side of the vehicle or a pressure decrease in the major chambers of the wheel rams on one side of the vehicle is reacted by the interconnection means, thereby providing a roll stiffness, and wherein in each fluid chamber pair, one bump chamber is a front bump chamber which varies in volume proportionally and in an opposite sense to the front system chamber therein with piston motion, the other bump chamber being a rear bump chamber, to thereby provide pitch stiffness, the front bump chambers of the first and second fluid chamber pairs being in fluid communication and the rear bump chambers of the first and second fluid chamber pairs being in fluid communication, such that fluid can be transferable therebetween to thereby provide a minimal cross-axle articulation stiffness, the front bump chambers being in fluid communication with a front bump accumulator means and the rear bump chambers being in fluid communication with a rear bump accumulator means.

2. The load distribution unit according to claim 1, wherein the wheel ram is a double acting ram further comprising a minor chamber in which a piston rod of the wheel ram is located, the major chamber of each wheel ram being in direct fluid communication with the minor chamber of a diagonally opposite said wheel ram by a fluid communicating conduit, with each said system chamber of the load distribution unit being in fluid communication with a respective said fluid communicating conduit.

3. The load distribution unit according to claim 1, wherein a flexible fluid container is located within each said system chamber and is respectively in fluid communication with the major chamber of a said wheel ram, and a flexible fluid container is located within each bump chamber, with fluid communication being provided between the fluid containers in each pair of bump chambers such that the fluid pressure within the communicating bump chambers is transferable therebetween to thereby enable a pressure balance to be achieved between the system chambers.

4. The load distribution unit according to claim 1, wherein the fluid chamber pairs are joined together side by side such that the axis of the two fluid chambers of the first pair thereof is parallel to the axis of the two fluid chambers of the second pair thereof.

5. The load distribution unit according to claim 1, wherein the first and second fluid chamber pairs are located in different locations in the vehicle.

6. The load distribution unit according to claim 1, wherein the first and second fluid chamber pairs are axially aligned such that the two fluid chambers of the first pair and the two fluid chambers of the second pair are all substantially axially aligned along a common axis.

7. A load distribution unit for a vehicle suspension system having at least one pair of laterally adjacent forward wheel assemblies, and at least one pair of laterally adjacent rear wheel assemblies, a wheel ram associated with each said wheel assembly, each wheel ram including a major chamber therein, wherein the load distribution unit includes three fluid chambers aligned along a common axis to thereby provide opposing first and second end chambers and a central chamber therebetween, the first and second end chambers being respectively divided by a piston supported therein into two control chambers, the central chamber being divided by two pistons into two control chambers and a central bump chamber, respective connection means interconnecting each of the pistons in the central chamber to the piston in an adjacent said end chamber to respectively provide first and second piston assemblies, said respective connection means comprising a rod extending between said first and second end chamber respectively and said central chamber, and contained entirely within said fluid chambers, two of the control chambers providing first and second bump chambers, the remaining four control chambers providing system chambers, wherein the two system chambers formed by each of the first and second piston assemblies, respectively provide front and rear system chambers respectively connectable to the major chamber of the wheel ram of a said forward wheel assembly, and a said rear wheel assembly on the same side of the vehicle, such that a pressure increase in the major chambers of the wheel rams on one side of the vehicle or a pressure decrease in the major chambers of the wheel rams on one side of the vehicle is reacted by the interconnection means, thereby providing a roll stiffness, the central bump volume providing a first bump volume, the first and second bump chambers being in fluid communication to form a second bump volume, such that when the wheel assemblies are undergoing cross-axle articulation motions, the first and second piston assemblies are urged to move in the same axial direction, thereby providing minimal cross-axle articulation stiffness, the first and second bump volumes varying in volume proportionately and in opposite senses with relative motion between the first and second piston assemblies, one of said bump volumes providing a front bump volume which varies in volume proportionally and in an opposite sense to the front system chambers, the other said bump volume providing a rear bump volume, to thereby provide a pitch stiffness, wherein the front bump volume is in fluid communication with a front bump accumulator means and the rear bump volume is in fluid communication with a rear bump accumulator means.

8. The load distribution unit according to claim 7, wherein the wheel ram is a double acting ram further comprising a minor chamber in which a piston rod of the wheel ram is located, the major chamber of each wheel ram being in direct fluid communication with the minor chamber of a diagonally opposite said wheel ram by a fluid communicating conduit, with each said system chamber of the load distribution unit being in fluid communication with a respective said fluid communicating conduit.

9. The load distribution unit according to claim 7, wherein a flexible fluid container is located within each said system chamber and is respectively in fluid communication with the major chamber of a said wheel ram, and a flexible fluid container is located within each bump chamber, with fluid communication being provided between the fluid containers located within the first and second bump chambers such that the fluid pressure within the communicating bump chambers is transferable therebetween to thereby enable a pressure balance to be achieved between the system chambers.

10. A load distribution unit for a vehicle suspension system having at least one pair of laterally adjacent forward wheel assemblies, and at least one pair of laterally adjacent rear wheel assemblies, a wheel ram associated with each said wheel assembly, each wheel ram including a major chamber therein, wherein the load distribution unit includes a housing divided into a pair of chamber sets, each chamber set including two axially aligned end chambers and a central chamber located and axially aligned therebetween, pistons respectively located within the central chamber and within each said end chamber, the pistons being interconnected to thereby provide for common movement of the interconnected pistons within each chamber set, the piston within the central chamber dividing said central chamber into two control chambers, the piston within each said end chamber dividing said end chamber to provide a control chamber on one side thereof, the piston interconnection means comprising a rod contained entirely within said housing, two pairs of the control chambers providing bump chambers which vary in volume proportionally and in opposite senses with piston motion, the remaining two pairs of the control chambers providing system chambers, a flexible fluid container being located within each said system chamber and being respectively adapted to be in fluid communication with the major chamber of a said wheel ram the interconnected pistons within each chamber set capable of being urged for movement in the same axial direction when the wheel assemblies are undergoing cross-axle articulation motion and capable of being urged for movement in opposing axial directions when the vehicle is undergoing pitch motion to thereby confer minimal articulation stiffness and provide a pitch stiffness which is independent of the roll, four wheel bounce or articulation stiffnesses, a flexible fluid container being located within each bump chamber, with fluid communication being provided between the fluid containers in each pair of bump chambers such that the fluid pressure within the communicating bump chambers is transferable therebetween to thereby enable a pressure balance to be achieved between the system chambers, wherein each said pair of bump chambers is in fluid communication with a bump accumulator means.

* * * * *